(12) United States Patent
Muroi

(10) Patent No.: US 7,642,739 B2
(45) Date of Patent: Jan. 5, 2010

(54) DEVICE AND METHOD FOR CONTROLLING MOTOR

(75) Inventor: Kazushige Muroi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/061,550

(22) Filed: Feb. 18, 2005

(65) Prior Publication Data

US 2005/0189898 A1 Sep. 1, 2005

(30) Foreign Application Priority Data

Feb. 26, 2004 (JP) .............................. 2004-051874

(51) Int. Cl.
*G05B 11/36* (2006.01)
(52) U.S. Cl. ...................................... 318/609; 318/610
(58) Field of Classification Search .................. None
See application file for complete search history.

(56) References Cited

U.S. PATENT DOCUMENTS 6,844,693 B2 * 1/2005 Tazawa et al. .............. 318/561

FOREIGN PATENT DOCUMENTS

| JP | 7-104807 A2 | 4/1995 |
| JP | 11-110048 A2 | 4/1999 |
| JP | 2001-063168 | 3/2001 |

OTHER PUBLICATIONS

English translation of Notification for Reason(s) for Rejection dated Aug. 15, 2007 in Japanese Application No. JP2004-51874, previously submitted with Applicant's IDS submission on Nov. 15, 2007.
Notification for Reason(s) for Rejection dated Aug. 15, 2007 in Japanese Application No. JP2004-51874.

* cited by examiner

*Primary Examiner*—Walter Benson
*Assistant Examiner*—Renata McCloud
(74) *Attorney, Agent, or Firm*—Banner & Witcoff, Ltd

(57) ABSTRACT

A speed direction corrector determines whether a speed Vp corresponding to a manipulated variable Up generated by a position controller is larger than a target speed Vt set in a target speed setting register (Vp>Vt). If Vp≦Vt, the manipulated variable corresponding to the target speed Vt is corrected to the manipulated variable Up to produce a new manipulated variable Uf. If Vp>Vt, a manipulated variable corresponding to the target speed Vt is set to the new manipulated variable Uf as is. As above, in a deceleration section where Vp≦Vt, the manipulated variable of a position control is reflected in the manipulated variable of a speed control. Combined use of the speed control and the position control becomes possible without a need to execute a complicated process in which the manipulated variable is regulated at the time of switching from the speed control to the position control.

6 Claims, 10 Drawing Sheets

DEVICE AND METHOD FOR CONTROLLING MOTOR

BACKGROUND OF THE INVENTION i) Technical Field of the Invention

This invention relates to a device and a method for controlling motor operation.

ii) Description of the Related Art

Currently, a feedback control is commonly used to control a motor which operates a carriage of a printer. In such a printer, it is necessary to accelerate the carriage to a predetermined speed, move the carriage at the predetermined speed in a section scanning a recording sheet, and then decelerate the carriage so as to stop the carriage at a predetermined stop position.

If the carriage is not accelerated to a target speed in an acceleration section where the carriage should be accelerated, and is not accurately moved at a certain speed in a constant-speed section where the carriage should be moved at the certain speed, a recording position onto the recording sheet cannot be settled. If the carriage does not accurately stop at the desired stop position in a deceleration section where the carriage should be decelerated, the recording position onto the recording sheet is shifted as the carriage is moved from then on. As a result, the quality at the time of recording onto the recording sheet (recording quality) is deteriorated.

Accordingly, it is desirable to use both the speed control which focuses on a traveling speed of the carriage in the acceleration section and the constant-speed section, and the position control which focuses on a position of the carriage in the deceleration section.

However, if the speed control and the position control are merely switched over, the manipulated variable to the motor becomes instantaneously destabilized at the time of switching the control. The traveling speed of the carriage is irregularly changed. Thus, recording quality may be lowered.

These days, various techniques are introduced to inhibit such irregular changes in the traveling speed of the carriage. For example, Unexamined Japanese Patent Publication No. 2001-63168 discloses a technique in which a manipulated variable to a motor is regulated (the control is performed by setting "0" to the positional error) at the time of the switching from the speed control (accelerating and constant-speed states) to the position control (decelerating state). Thus, an abrupt change in the manipulated variable to the motor is prevented.

SUMMARY OF THE INVENTION

However, the above technique requires a complicated process that includes switching from the speed control to the position control and regulating the manipulated variable to the motor at the time of the switching.

One object of the present invention is to provide a technique that requires only a simple process in such a combined use of the speed control and the position control.

In order to attain the above object, in one aspect of the present invention, there is provided a motor control device comprising: a motor that drives a plant; a speed detection unit that detects a traveling speed of the plant; and a speed control unit that determines a manipulated variable based on an error between a detection speed detected by the speed detection unit and a given target speed. The motor control device controls operation of the motor based on the manipulated variable determined by the speed control unit. The motor control device further comprises: a position detection unit that detects a position of the plant; a position control unit that determines a manipulated variable based on an error between a detection position detected by the position detection unit and a given target position; and a direction correction unit that corrects directions to the speed control unit based on the manipulated variable determined by the position control unit. The direction correction unit, when the manipulated variable determined by the position control unit is a manipulated variable corresponding to the target speed or above, directs a manipulated variable corresponding to the target speed to the speed control unit. The direction correction unit, when the manipulated variable is a manipulated variable corresponding to a speed below the target speed, directs the manipulated variable determined by the position control unit to the speed control unit.

According to the motor control device as stated above, the manipulated variable of the position control is reflected in the manipulated variable of the speed control when and after the manipulated variable of the position control has become the manipulated variable corresponding to the speed below the target speed. Accordingly, there is no need to perform a complicated process, such as controlling the manipulated variable at the time of the switching from the speed control to the position control, in order to use the speed control and the position control together.

Furthermore, the speed indicated in the directions to the speed control unit gradually lowers from the target speed, when and after the directions to the speed control unit have been started to be corrected to the manipulated variable from the position control unit, that is, when and after the simultaneous use of the speed control and the position control has started. Accordingly, the manipulated variable to the motor can be gradually reduced. The plant is secure from the destabilized behavior due to irregular changes in the manipulated variable to the motor.

A rotary encoder or a linear encoder is used in the aforementioned speed detection unit and the position detection unit so as to detect the speed and the position of the plant based on the count value of the encoder signal outputted as a result of the operation of the plant or the motor.

Any position control method can be used in the position control. For example, the manipulated variable directed to the speed control unit may be determined by a proportional control.

Parameters (gains) used in the proportional control can be easily determined, as compared to parameters used in other control systems like a PID (Proportional-Integral-Derivative) control, from a traveling speed of the plant, a deceleration start position where deceleration of the plant is started, a target stop position where the plant stops, and so on. Therefore, designing of the whole motor control device becomes simple.

The traveling speed of the plant is not sufficiently high at the time when the traveling of the plant is started by the aforementioned motor control device. Therefore, an error between the speed and the target speed becomes large. There is a fear that the manipulated variable, which may move the plant at a speed exceeding the target speed, is directed to the motor. Even in the aforementioned case, the traveling speed of the plant can be controlled to go down to the target speed after having exceeded (overshot) the target speed. However, such a control is not desirable since it may take long for the traveling speed to be settled at the target speed, and the behavior of the target control may become unstable.

In order to prevent the motor from being directed such an undesirable manipulated variable, the motor control device of the present invention may comprise a speed direction unit that directs the speed control unit to spend a predetermined time to vary the manipulated variable corresponding to the speed of the plant, from the manipulated variable corresponding to the initial speed of the plant lower than the target speed, to the manipulated variable corresponding to the target speed.

In this manner, even if the manipulated variable directed to the speed control unit is largely varied, there is a delay in reflecting the variation in the directions to the speed control unit. No extremely large error is produced between the traveling speed of the plant and the target speed. Accordingly, it is possible to prevent the manipulated variable which may move the plant at a speed exceeding the target speed from being directed to the motor.

Particularly, the speed direction unit may comprise a storing unit that stores a profile by which the manipulated variable corresponding to the speed of the plant is sequentially varied from the manipulated variable corresponding to the initial speed of the plant lower than the target speed to the manipulated variable corresponding to the target speed, and direct the speed control unit according to the profile stored in the storing unit. Or, the speed direction unit may direct the speed control unit via a delay filter, so that a delay is occurred in varying the manipulated variable corresponding to the speed of the plant from the manipulated variable corresponding to the initial speed lower than the target speed to the manipulated variable corresponding to the target speed.

Specifically, in the latter case (in the case of the delay filter), it is not necessary to provide the storing unit for storing the profile, so that the motor is not given a manipulated variable which may move the plant at a speed exceeding the target speed. The speed control unit can be configured more simply than the speed control unit in the former case.

A variation in the direction value (target speed) to the speed control unit is transmitted in a delayed manner in the latter case. However, depending on the traveling state of the plant, such as when the plant is in the deceleration section where the plant is decelerated to stop at the stop position, there are cases in which it is preferable that the variation in the direction value to the speed control unit is transmitted without delay.

Therefore, it is preferable that the speed direction unit can be switched either or not to cause a delay by way of the delay filter, depending on the traveling state of the plant defined by the detection speed or the detection position.

Either or not to cause a delay is determined when the plant has entered the deceleration section, for example. In this case, the speed direction unit can be switched so as not to cause a delay, if the following states are detected, i.e., the detection position has passed the position where deceleration can be started, and the direction speed has begun to decrease (output value of the position control unit<manipulated variable corresponding to the target speed).

Also, another configuration may be considered in order to prevent the manipulated variable which may move the plant at a speed exceeding the target speed from being directed to the motor. That is, the speed control unit may be capable of determining the manipulated variable based on a plurality of control systems including at least a robust control system. The speed control unit determines the manipulated variable based on the control systems other than the robust control system until the plant reaches the target speed. After the plant has reached the target speed, the speed control unit determines the manipulated variable based on the robust control system.

In a common PID control, that is referred to as a classical control, the optimum control for individuals can be designed by tuning. For example, even if the manipulated variable to the plant is fluctuated due to the influence of external disturbance, designing that allows immediate converging on the target value is possible. However, in mass production, individual difference among the products cannot be avoided. Therefore, there is a fear that the tuning ideal for an individual may not necessarily produce the optimum control for others. Use of the robust control, as in the present invention, may not completely remove the influence of the aforementioned individual difference. However, it is possible to minimize the influence. Specifically, in a product, such as an ink jet printer, in which a plant needs to be accurately driven by a motor, it is important to reduce the influence of the individual difference. On the other hand, even if the robust control can reduce the influence of the individual difference, it is generally difficult to draw a design (make adjustment) from a time response standpoint in the designing process.

Accordingly, designing by a control like the PID control allows easy tuning such as to converge the operation value (position or speed) of the plant on the target value, while a robust controller, specialized in controlling the influence of external disturbance, generates a large overshoot at the startup if used alone, since the robust controller is highly sensitive to an error between the direction value and the operation value (detected value).

If the speed control unit is designed to determine the manipulated variable highly responsive to the target speed based on the control systems (such as I-P, PI control systems) which offer high design flexibility for the time response until the plant reaches the target speed as stated above, application of the manipulated variable which may move the plant at a speed exceeding the target speed to the motor can be inhibited. Furthermore, if the manipulated variable can be determined based on the robust control system that offers a stable control against the external disturbance after the plant has reached the target speed, the plant can be moved at a steady speed (the target speed).

It is further preferable that the speed control unit, when determining a manipulated variable based on the robust control system, may determine the manipulated variable by adding the manipulated variable obtained when the plant has reached the target speed by the control system other than the robust control system, to the manipulated variable calculated by the robust control system which receives an error between the target speed and the detection speed.

In the above manner, fluctuation in the output due to the switching of the control system does not occur, even if the control is actually switched as the plant reaches the target speed. In the robust control system, it is common to determine the manipulated variable using the internal state of the controller calculated based on the past input (error between the direction speed and the detection speed). When switching (carrying over) the control unit from one driving state to the robust control, the internal state may be filled out by camouflage by way of some calculation. However, by carrying over the manipulated variable used by other control systems as stated above, it is possible to lessen the load of the process that determines the manipulated variable, as compared to the case in which some formula may be used in calculation of the manipulated variable.

In another aspect of the present invention, there is provided a motor controlling method that determines a manipulated variable based on an error between a traveling speed of a plant driven by a motor and a target speed to control operation of the motor, and controls operation of the motor based on the determined manipulated variable. The method comprises the steps of: determining a manipulated variable based on an error between a position of the plant and a target position; and correcting the target speed to the lower speed based on the determined manipulated variable if the manipulated variable, determined based on the error between the position of the plant and the target position, is a manipulated variable corresponding to a speed below the target speed, and not correcting the target speed if the manipulated variable determined based on the error between the position of the plant and the target position is a manipulated variable corresponding to the target speed or above.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

First Embodiment

Figure 1:
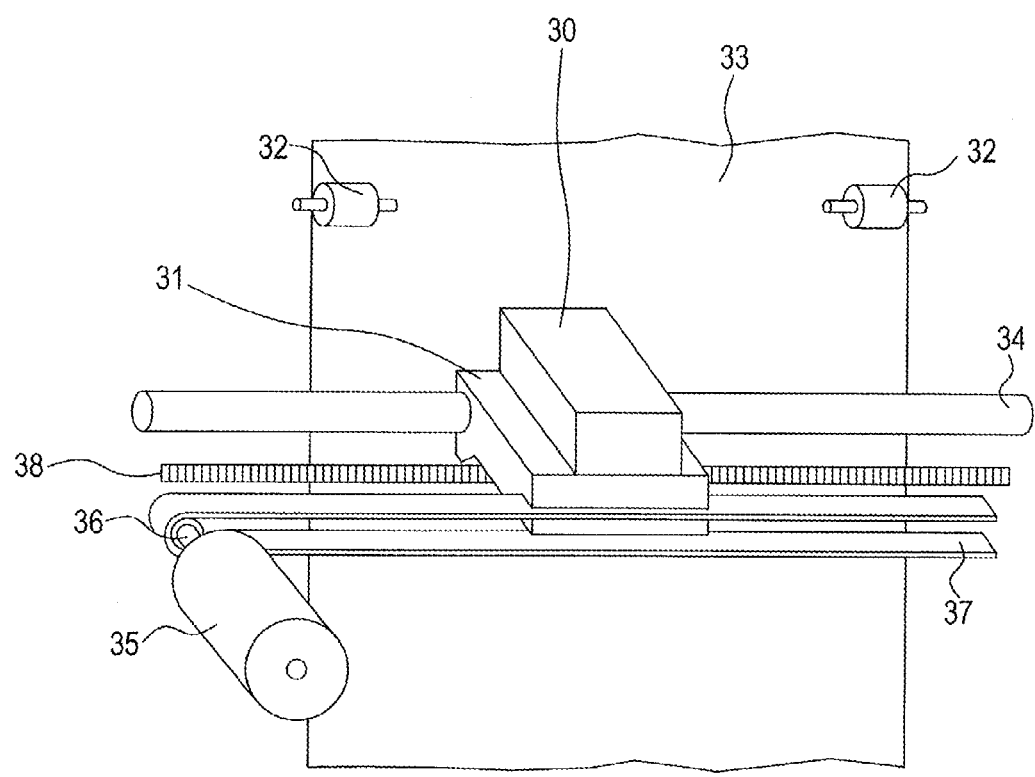
FIG. 1 is a structural diagram of a carriage driving mechanism according to the present invention.

An ink jet printer (hereafter, referred to as a "printer") comprises a carriage driving mechanism. In the carriage driving mechanism shown in FIG. 1, a record head 30 mounted on a carriage 31 performs recording by ejecting an ink toward a printing sheet 33 from a nozzle. The printing sheet 33 is conveyed by retainer rollers 32. A guide shaft 34 is provided in a width direction of the printing sheet 33. The carriage 31 is slidably supported by the guide shaft 34.

A control motor (CR motor) 35 is provided on one end of the guide shaft 34. Between a pulley 36 of the CR motor 35 and an idle pulley (not shown) provided on the other end of the guide shaft 34, an endless belt 37 is held along the guide shaft 34. The carriage 31 is connected to the endless belt 37. That is, the carriage 31 is designed to move back and forth in a width direction of the printing sheet 33 along the guide shaft 34 by a driving force of the CR motor 35 transmitted via the endless belt 37.

A timing slit 38 is provided below and along the guide shaft 34. Slits having a certain interval therebetween (1/150 inches=approximately 0.17 mm, in the present embodiment) are formed on the timing slit 38.

A detector (not shown) is provided in a lower part of the carriage 31. The detector is composed of a photo interrupter in which a light emitting element and a light receiving element are arranged to face each other. The timing slit 38 is positioned between the light emitting element and the light receiving element. The detector and the timing slit 38 together constitute a later-explained linear encoder 39 (see FIG. 4).

Figure 2:
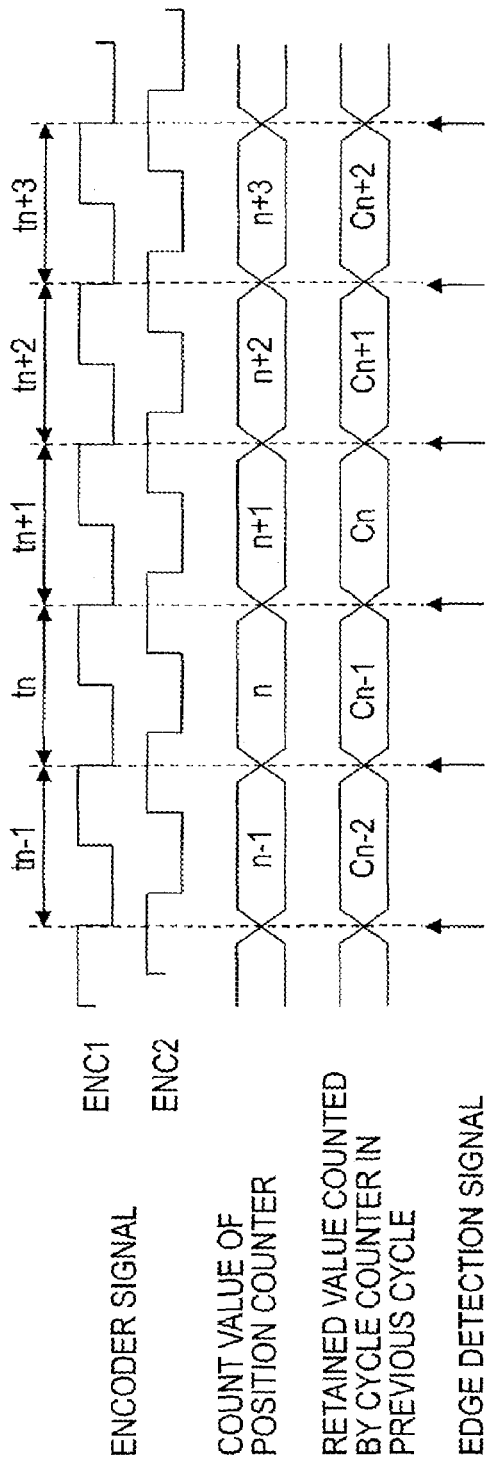
FIG. 2 is a diagram showing a traveling state of a carriage.

As shown in FIG. 2, the detector outputs two types of encoder signal, ENC1 and ENC2. The phase of ENC1 and the phase of ENC2 are shifted by a predetermined cycle (¼ cycles, in the present embodiment). When the carriage 31 is moved in a forward direction, that is, from the home position (the left end position in FIG. 1) to the side of the idle pulley, the phase of ENC1 is advanced ahead of the phase of ENC2 by the predetermined cycle. When the carriage is moved in a reverse direction, that is, from the side of the idle pulley to the home position, the phase of ENC1 is delayed from the phase of ENC2 by the predetermined cycle.

Figure 3:
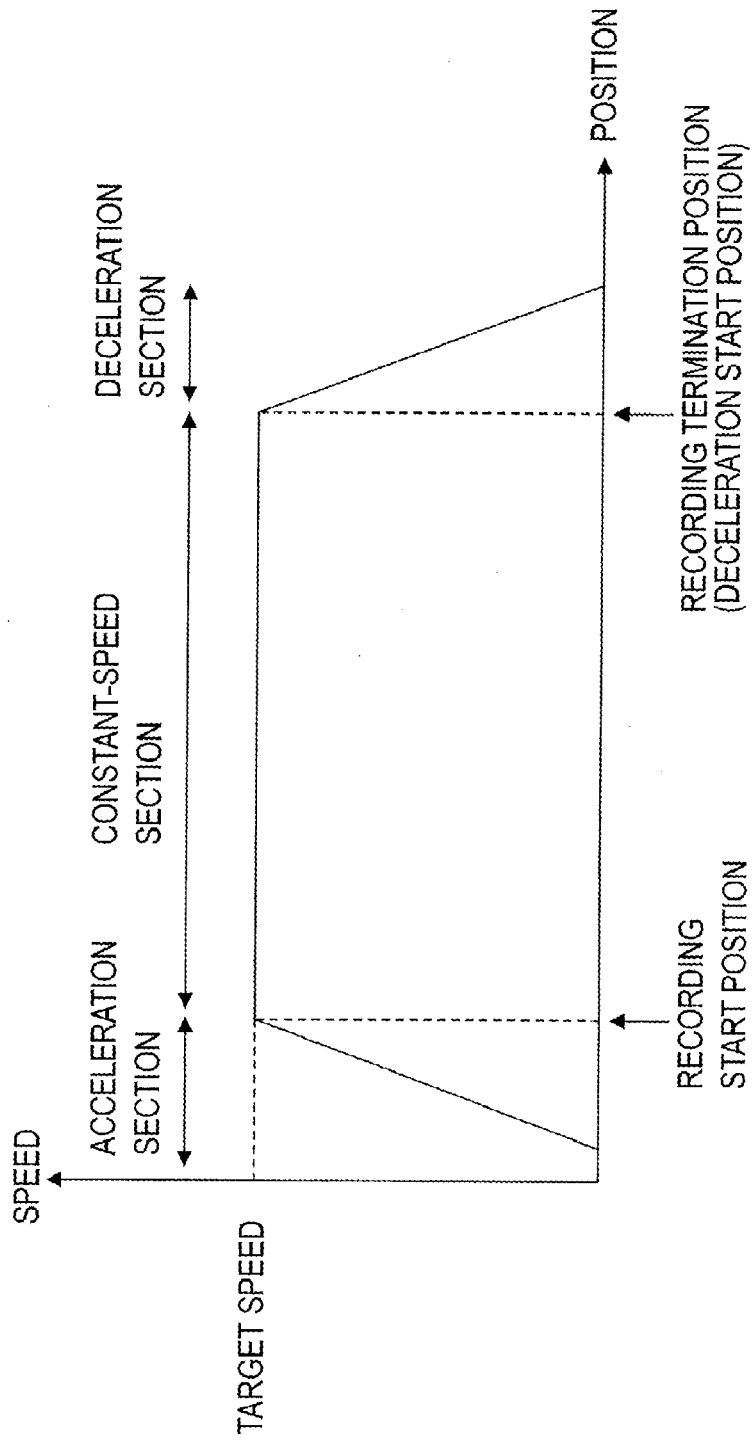
FIG. 3 is a diagram showing an output pattern of encoder signal.

In the above carriage driving mechanism, when a recording process is not performed, the carriage 31 stands by at the home position set near the side end of the pulley 36 of the guide shaft 34 or a position where the last recording has ended (hereafter, the position from which the carriage 31 is started to be moved is referred to as an "original position"). When the recording process is started, as shown in FIG. 3, the carriage 31 is accelerated so as to reach a target speed before reaching a predetermined recording start position. Then, the carriage 31 is moved at a certain target speed till it reaches a predetermined recording termination position. After passing the recording termination position, the carriage 31 is decelerated until it stops. Hereafter, a section from the original position to the recording start position is referred to as an acceleration section. A section from the recording start position to the recording termination position is referred to as a constant-speed section. A section from the recording termination position to where the carriage 31 stops is referred to as a deceleration section.

Figure 4:
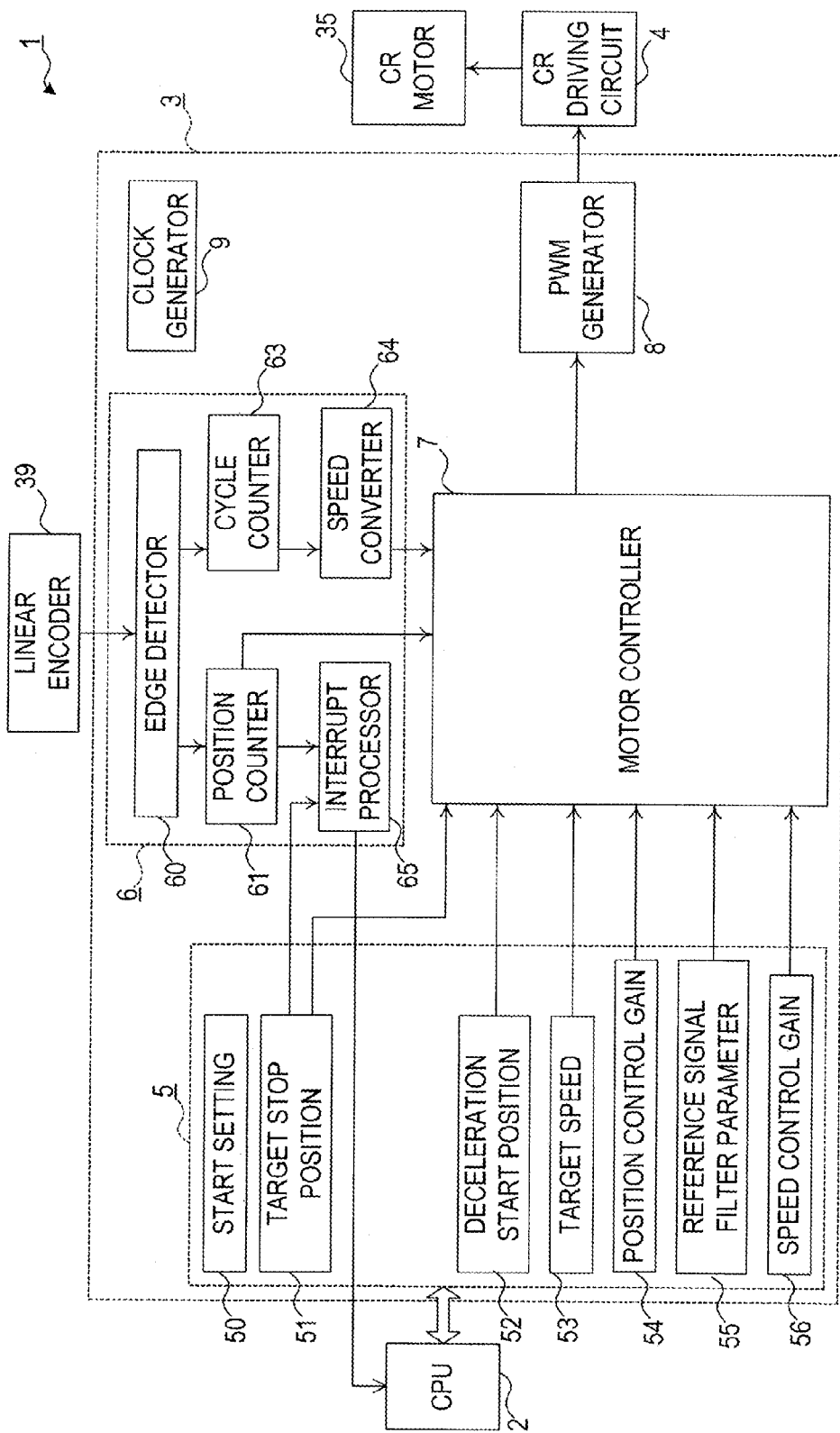
FIG. 4 is a block diagram showing a structure of a carriage control device.

Referring to FIG. 4, a carriage control device 1 is provided inside of the printer. The carriage control device 1 comprises a CPU 2 that manages controls of the printer, an ASIC (Application Specific Integrated Circuit) 3 that generates a PWM (Pulse Width Modulation) signal controlling a rotation speed and a rotation direction of the CR motor 35, and a motor driving circuit (CR driving circuit) 4 that controls four FETs (Field-Effect Transistors) in an H-bridge circuit based on the PWM signal generated by the ASIC 3 to drive the CR motor 35.

The ASIC 3 comprises registers 5 that store various parameters for use in controlling the CR motor 35, a carriage position measurer 6 that calculates the position and the traveling speed of the carriage 31 according to the encoder signals ENC1 and ENC2 received from the linear encoder 39, a motor controller 7 that generates a motor control signal for controlling a rotation speed of the CR motor 35 based on data from the various parameters stored in the registers 5 and the data obtained from the carriage position measurer 6, a PWM generator 8 that generates a PWM signal having a duty ratio corresponding to the motor control signal generated by the motor controller 7, and a clock generator 9 that supplies a clock signal having a cycle sufficiently shorter than the cycle of the encoder signals ENC1 and ENC2, to each part of the ASIC 3.

The registers 5 include a start setting register 50 that is used to start the CR motor 35, a target stop position setting register 51 that is used to set a target stop position where the carriage 31 should stop, a deceleration start position setting register 52 that is used to set a deceleration start position (the same position as the recording termination position) where the deceleration of the carriage 31 is started, a target speed setting register 53 that is used to set a target speed of the carriage 31, a position control gain setting register 54 that is used to set a position control gain for use in a feedback calculation at the time of controlling the rotation speed (torque) of the CR motor 35, a reference signal filter parameter setting register

55 that is used to set a parameter for a later-explained reference signal filter, and a speed control gain setting register 56 that is used to set a speed control gain for use in the feedback calculation. The aforementioned "deceleration start position" does not only mean the position where the deceleration is started, but the position at least to which the carriage 31 should maintain the target speed. In other words, after the carriage 31 has reached the position, the deceleration can be started.

The carriage position measurer 6 includes: an edge detector 60 that detects an edge detection signal indicating the start/end of each cycle of the encoder signal ENC1 (that is, particularly an edge of ENC1 when ENC2 is at a high level) based on the encoder signals ENC1 and ENC2 from the linear encoder 39, and a rotation direction of the CR motor 35 (a forward direction if a leading edge of ENC1 is detected, and a reverse direction if a trailing edge of ENC1 is detected); a position counter 61 that detects which slit from the home position the carriage 31 is located by incrementing (in case of the forward direction) or decrementing (in case of the reverse direction) the number of the edge detection signal according to the rotation direction of the CR motor 35 (i.e., a traveling direction of the carriage 31) detected by the edge detector 60; a cycle counter 63 that counts an interval at which the edge detection signal from the edge detector 60 is generated by counting a clock signal; a speed converter 64 that calculates the traveling speed of the carriage 31 based on a distance ($\frac{1}{150}$ inches) between the slits of the timing slit 38 and time tn−1 (=Cn−1×clock cycle period) specified by a retained value Cn−1 which is a value counted by the cycle counter 63 in the previous cycle of the encoder signal ENC1; and an interrupt processor 65 that outputs a stop interrupt signal to the CPU 30 when a count value obtained from the position counter 61 is equal to or more than the target stop position set in the target stop position setting register 51.

Figure 5:
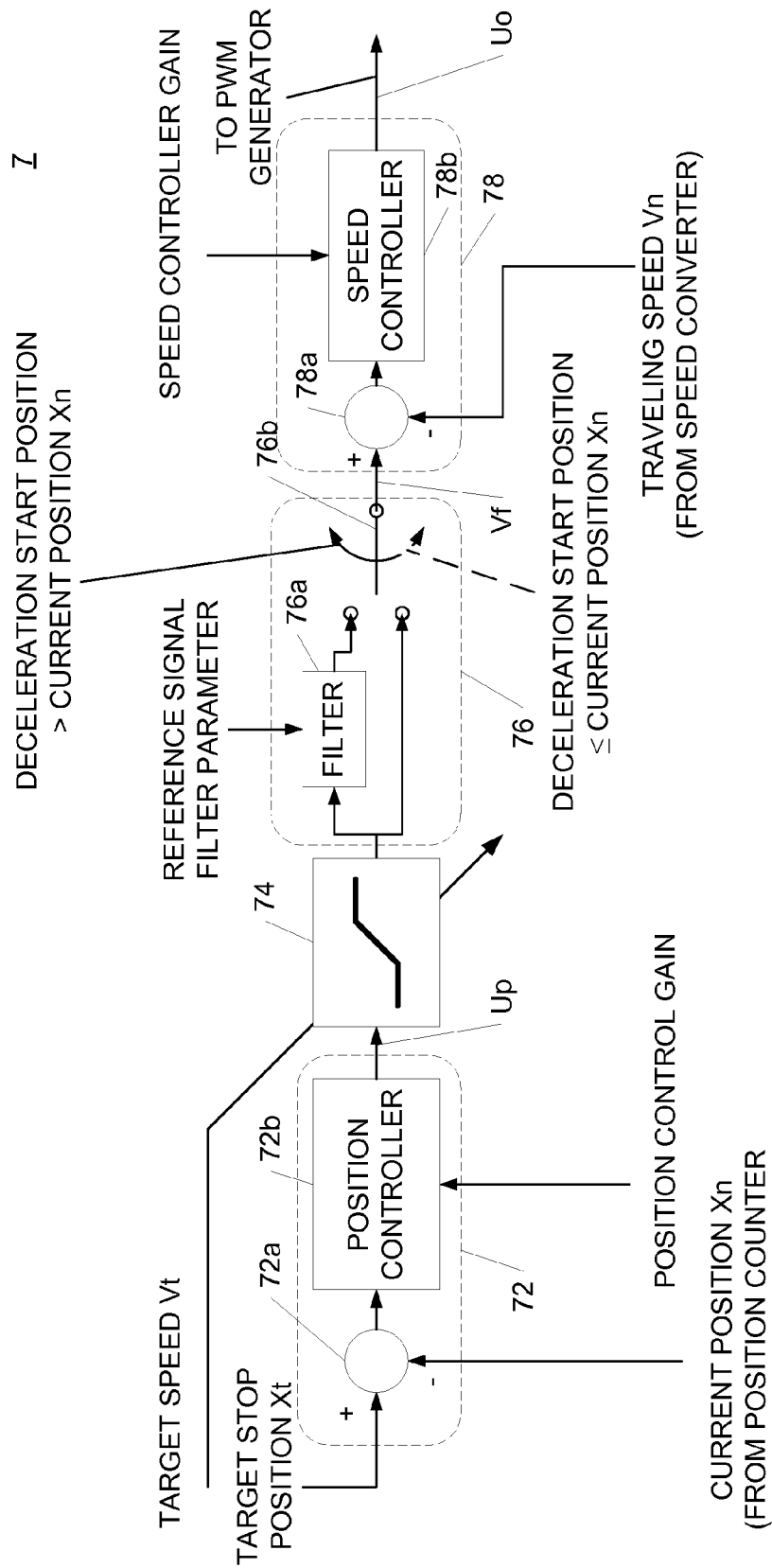
FIG. 5 is a block diagram showing a structure of a motor controller in a first embodiment.

The motor controller 7, as shown in FIG. 5, includes: a position controller 72 that generates a manipulated variable by a proportional control (P control) based on an error between the target stop position set in the target stop position setting register 51 and the current position of the carriage 31 defined by the count value in the position counter 61; a speed direction corrector 74 that corrects the target speed set in the target speed setting register 53 based on the manipulated variable obtained from the position controller 72; a reference signal filter 76 that moderates an abrupt change in the target speed corrected by the speed direction corrector 74; and a speed controller 78 that generates the manipulated variable by a PID control based on an error between the target speed processed in the reference signal filter 76 and the traveling speed of the carriage 31 calculated by the speed converter 64.

In the motor controller 7, the speed direction corrector 74 corrects the target speed to the speed corresponding to the manipulated variable from the position controller 72 only when the speed corresponding to the manipulated variable from the position controller 72 is lower than the target speed set in the target speed setting register 53. In other words, the speed direction corrector 74 saturates the manipulated variable from the position controller 72 with the manipulated variable corresponding to the target speed set in the target speed setting register 53.

Figure 6:
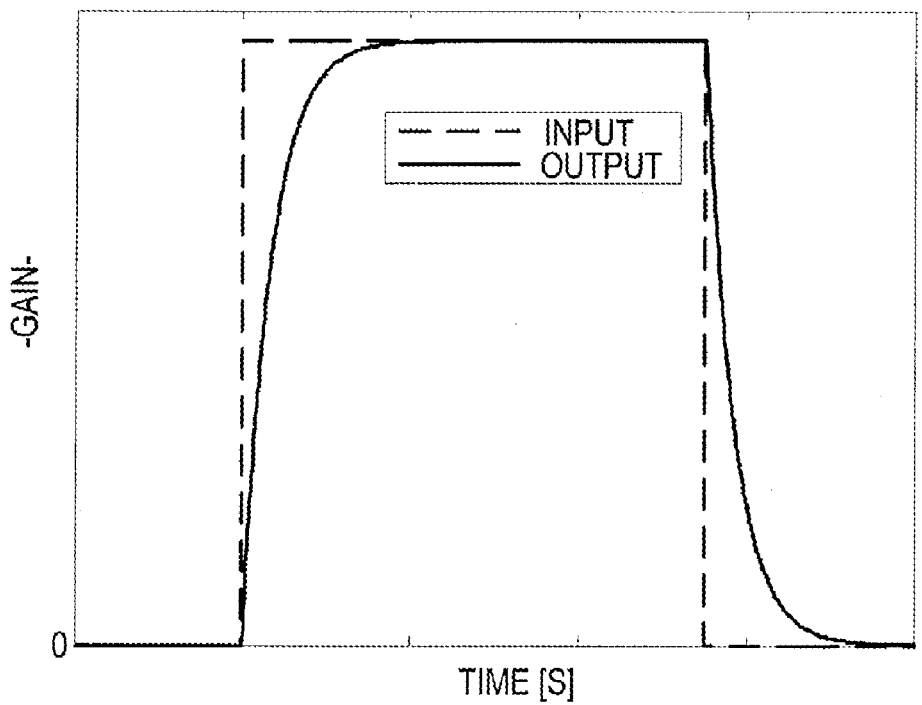
FIG. 6 is a diagram showing a property of a reference signal filter.

The reference signal filter 76 is provided with a path connecting to a filter 76a, which delays the manipulated variable corresponding to the target speed corrected by the speed direction corrector 74, and a path not connecting to the filter 76a, which does not delay the aforementioned manipulated variable. The reference signal filter 76 is capable of switching the paths by means of a switch 76b. The filter 76a has a property of outputting the change in the manipulated variable corresponding to the target speed corrected by the speed direction corrector 74 in a delayed manner, based on a reference signal filter parameter set in the reference signal filter parameter setting register 55 (see "input" and "output" in FIG. 6). The switch 76b is designed to be switched to the path connecting to the filter 76a only when the current position of the carriage 31 defined by the count value of the position counter 61 is smaller than the deceleration start position set in the deceleration start position setting register 52, that is, until the carriage 31 passes the deceleration start position.

Figure 7:
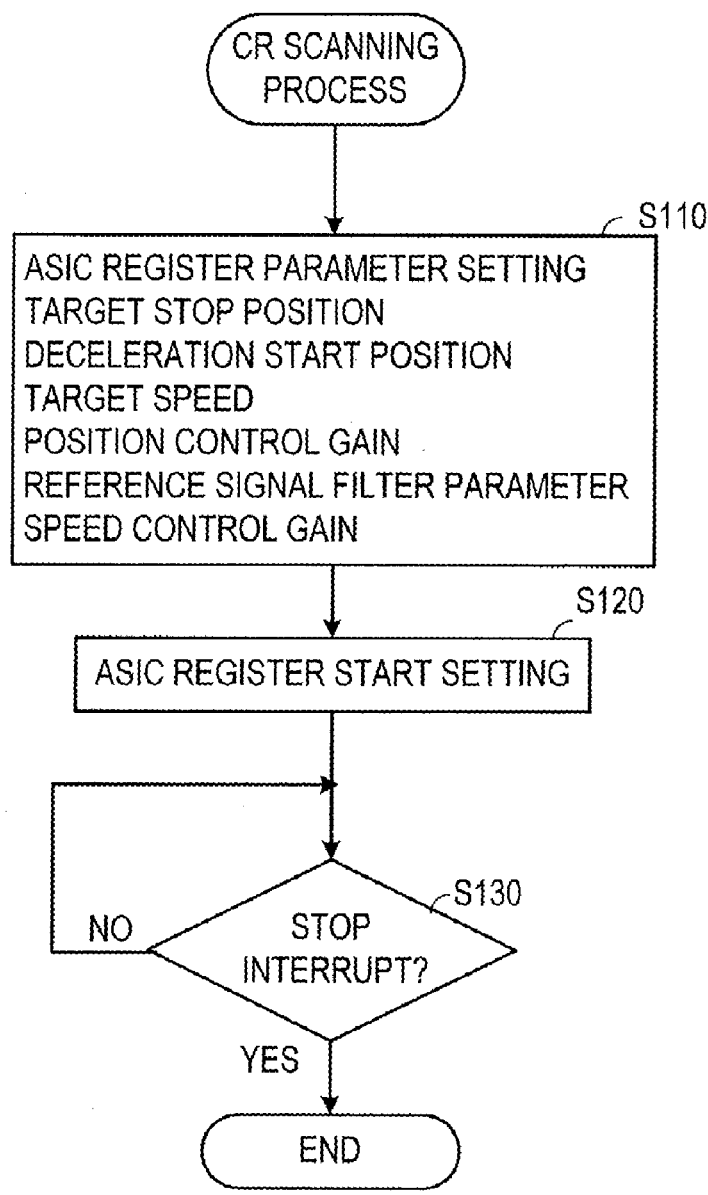
FIG. 7 is a flowchart showing a control (CR) scanning process performed by a CPU.

From now on, explanation on a CR scanning process performed by the CPU 2 is given by way of FIG. 7.

When the CR scanning process is started, the CPU 2 initializes the target stop position, deceleration start position, target speed, position control gain, reference signal filter parameter, and speed control gain in the respective registers of the registers 5 in the ASIC 3 (S110). A gain Kp, that can be obtained from a traveling speed Vt of the plant, a deceleration start position. Xd, and a target stop position Xt (Kp≧Vt/(Xt−Xd)), is set to the position control gain in the position control gain setting register 54 as a gain in a proportional control. The gain Kp is a parameter predetermined so that the carriage 31 does not start being decelerated before reaching the deceleration start position Xd.

Subsequently, data is written to the start setting register 50 so that the respective parts in the ASIC 3 can be started (S120). In this manner, after the ASIC 3 is started, the motor controller 7 repeatedly generates a control signal following the later-explained steps. The control signal is sequentially inputted to the CR driving circuit 4 via the PWM generator 8 so that the carriage 31 is moved by the CR motor 35. Later, when the carriage 31 is moved to the target stop position, a stop interrupt signal is outputted from the interrupt processor 65.

The CPU 2 stands by until the stop interrupt signal is inputted from (the interrupt processor 65 of) the ASIC 3 (S130: NO). When the stop interrupt signal is inputted (S130: YES), the process is ended.

Figure 8:
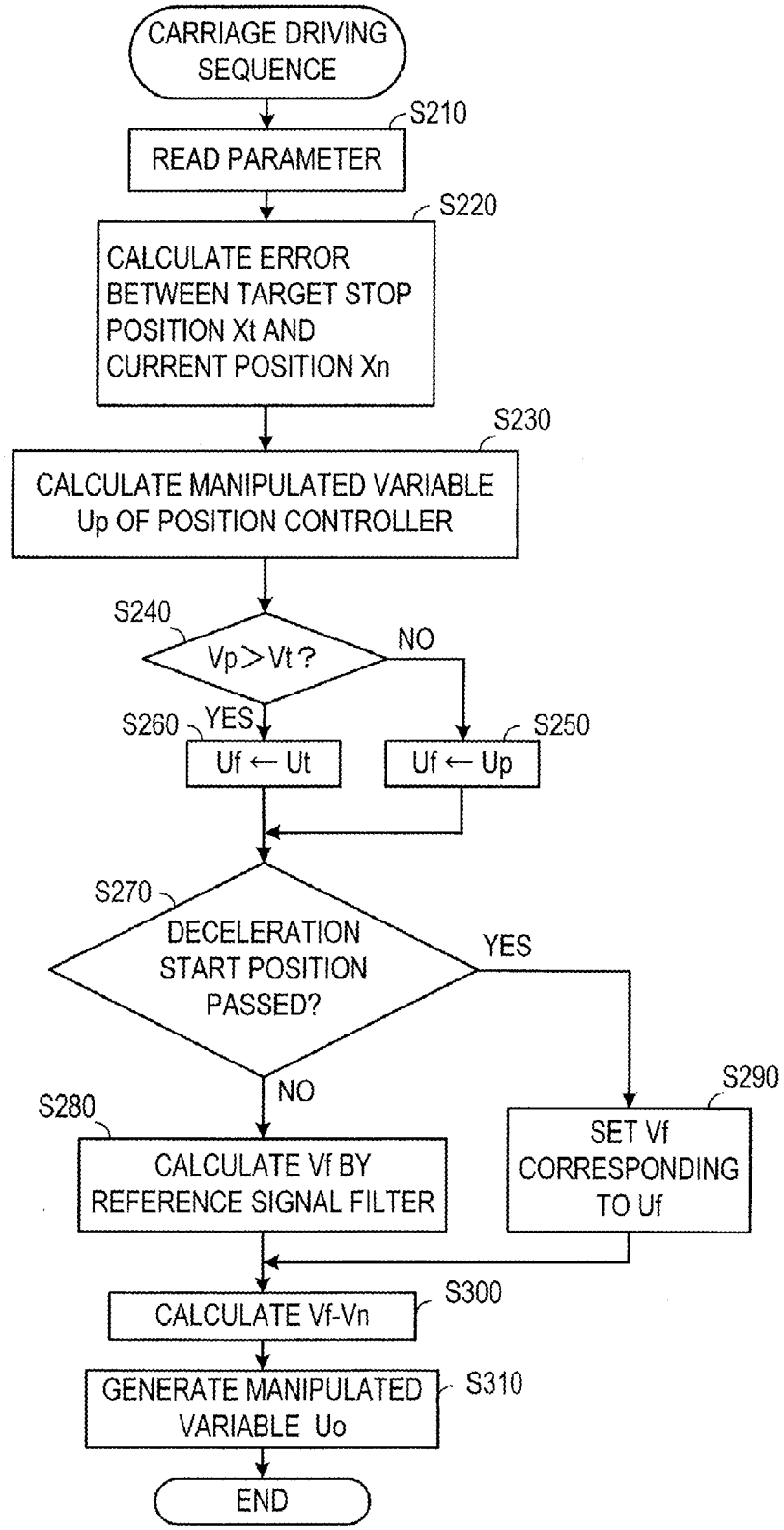
FIG. 8, is a flowchart showing steps in a carriage driving sequence in the first embodiment.

Now, steps in which the motor controller 7 of the ASIC 3 generates the control signal, when and after the ASIC 3 is started by the CR scanning process by the CPU 2, is explained by way of FIG. 8. The motor controller 7 is configured as a so-called hardware circuit so as to perform the following control operation. However, the control operation as the hardware circuit is replaced with a flowchart for the purpose of facilitating understanding.

First of all, the respective parameters set in the registers 5 are read out (S210). The position controller 72 calculates an error between the target stop position Xt set in the target stop position setting register 51 and the current position Xn of the carriage 31 defined from a count value of the position counter 61 (S220). A manipulated variable Up is generated based on the error using the proportional control (P control) (S230). In this step, the error between the target stop position Xt and the current position Xn is calculated by an adder 72a. Then, the manipulated variable Up is generated for setting "0" to the error, based on the gain (Kp) set in the position control gain setting register 54, by a position controller 72b.

The speed direction corrector 74 determines whether a speed Vp corresponding to the manipulated variable Up generated by the position controller 72 is larger than the target speed Vt set in the target speed setting register 53 (Vp>Vt) (S240). According to the determination, a manipulated variable Uf is newly generated which is obtained by correcting the target speed Vt. Particularly, if the speed value Vp corresponding to the manipulated variable Up is equal to or smaller than the target speed Vt (Vp≦Vt) (S240: NO), the target speed Vt is corrected to the speed value Vp corresponding to the manipulated variable Up and the manipulated variable Up is set to the new manipulated variable Uf (Uf←Up) (S250). Otherwise (Vp>Vt) (S240: YES), the manipulated variable Uf corresponding to the target speed Vt is set to the new manipulated variable Uf (Uf←Ut) (S260).

The reference signal filter 76 generates a speed direction Vf depending on whether the current position of the carriage 31 defined from the count value of the position counter 61 exceeds the deceleration start position set in the deceleration start position setting register 52. Particularly, if the carriage 31 has not yet passed the deceleration start position (S270: NO), the switch 76b is set to connected to receive the manipulated variable through filter 76a. The manipulated variable is generated which delays the manipulated variable Uf corrected by the speed direction corrector 74 by the filter 76a (S280). On the other hand, if the carriage 31 has passed the deceleration position (S270: YES), the switch 76b is set to receive the manipulated variable as received by the reference signal filter 76 from the speed direction corrector 74. The speed corresponding to the manipulated variable Uf corrected by the speed direction corrector 74 is set to the speed direction Vf to the speed controller 78 (S290).

The speed controller 78 calculates an error between the speed direction Vf obtained from the reference signal filter 76 and the traveling speed Vn of the carriage 31 calculated by the speed converter 64 (Vf−Vn) (S300). The speed controller 78 generates a manipulated variable Uo based on the error using the PID control (S310). In this step, the error between the speed direction Vf and the traveling speed Vn is calculated by an adder 78a. Later, the manipulated variable Uo is generated for setting "0" to the error, based on the gain set in the speed control gain setting register 56, by a speed controller 78b.

Then, a PWM signal having a duty ratio corresponding to the manipulated variable Uo obtained from the speed controller 78 is generated by the PWM generator 8. The CR motor 35 is driven by the PWM signal via the CR driving circuit 4.

Repeating the steps as above, the carriage 31 is moved so as to follow the target speed set in the target speed setting register 53 until the carriage 31 reaches to the deceleration start position set in the deceleration start position setting register 52. In the acceleration section before reaching the recording start position, the traveling speed is accelerated to reach the target speed. When and after the carriage 31 has reached the deceleration start position, the carriage 31 is moved to follow the target speed corrected by the error between the target stop position set in the target stop position setting register 51 and the current position of the carriage 31 defined from the count value of the position counter 61. Accordingly, in the deceleration section after the deceleration start position, the carriage 31 is promptly decelerated to stop at the target stop position.

Second Embodiment

The second embodiment is different from the first embodiment in that the motor controller 7 in the ASIC 3 of the carriage control device 1 is not provided with the reference signal filter 76, and that a plurality of controllers are provided in the speed controller 78.

Figure 9:
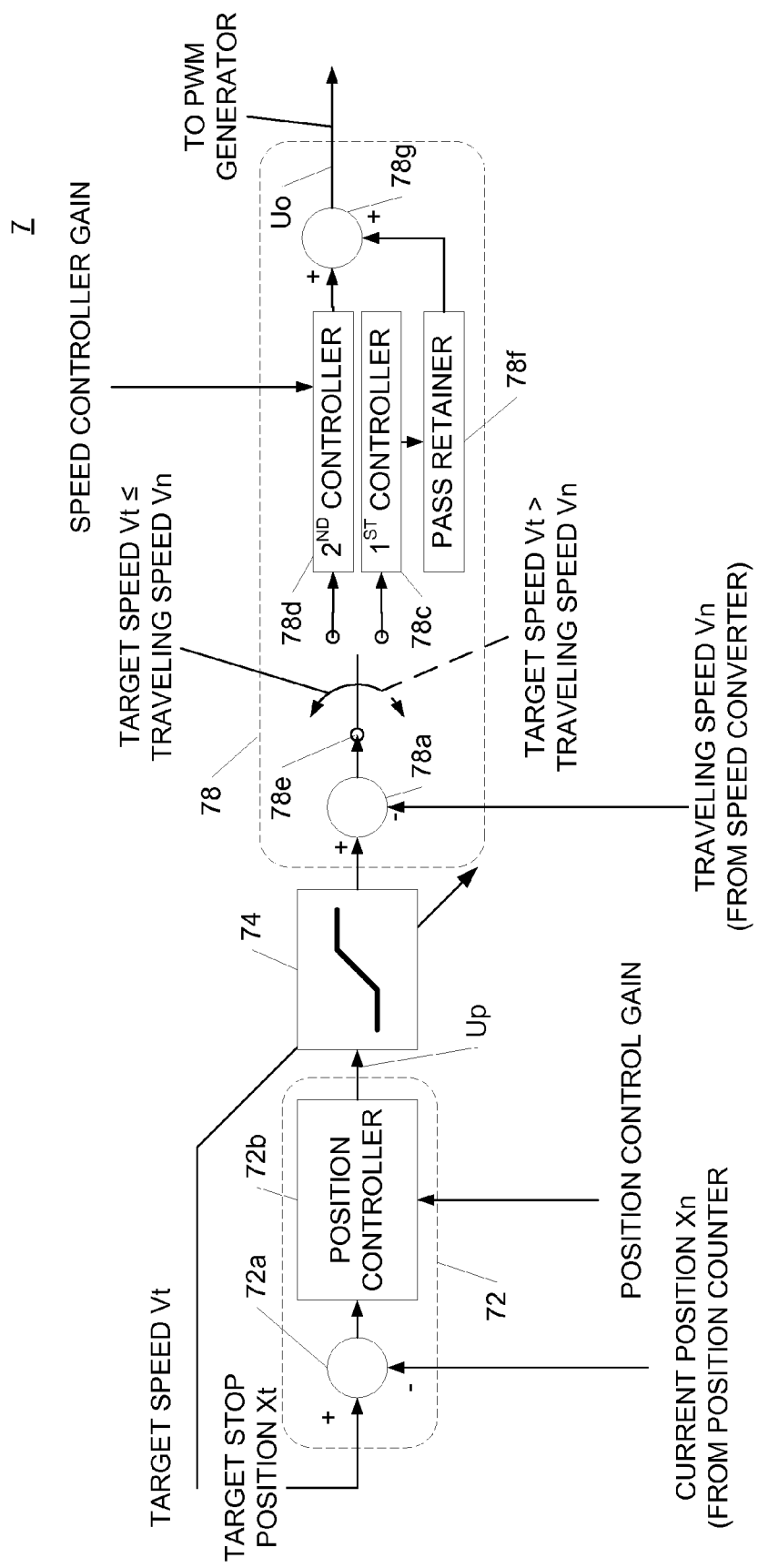
FIG. 9 is a block diagram showing a structure of a motor controller in a second embodiment.

In the present embodiment, as shown in FIG. 9, the speed controller 78 is capable of being switched to either a path that generates a manipulated variable using a first controller 78c or a path that generates a manipulated variable using a second controller 78d. The speed controller 78 is capable of switching the paths using a switch 78e. The manipulated variable generated by the first controller 78c is inputted to a pass retainer 78f.

The first controller 78c generates the manipulated variable by the I-P control. The second controller 78d generates the manipulated variable by the robust control.

The switch 78e is flipped to the side of the path that generates the manipulated variable using the first controller 78c, if the traveling speed of the carriage 31 calculated by the speed converter 64 does not reach the target speed set in the target speed setting register 53. On the other hand, the switch 78e is flipped to the side of the path that generates the manipulated variable using the second controller 78d, if the traveling speed has reached the target speed.

The pass retainer 78f retains (sets in a built-in register) the manipulated variable most recently generated by the first controller 78c. At the same time, if the switch 78e is flipped to the side of the path to the first controller 78c, the pass retainer 78f passes the manipulated variable of the first controller 78c to the side of the PWM generator 8, while, if the switch 78e is flipped to the side of the second controller 78d, passes the retained manipulated variable to the side of the PWM generator 8.

Figure 10:
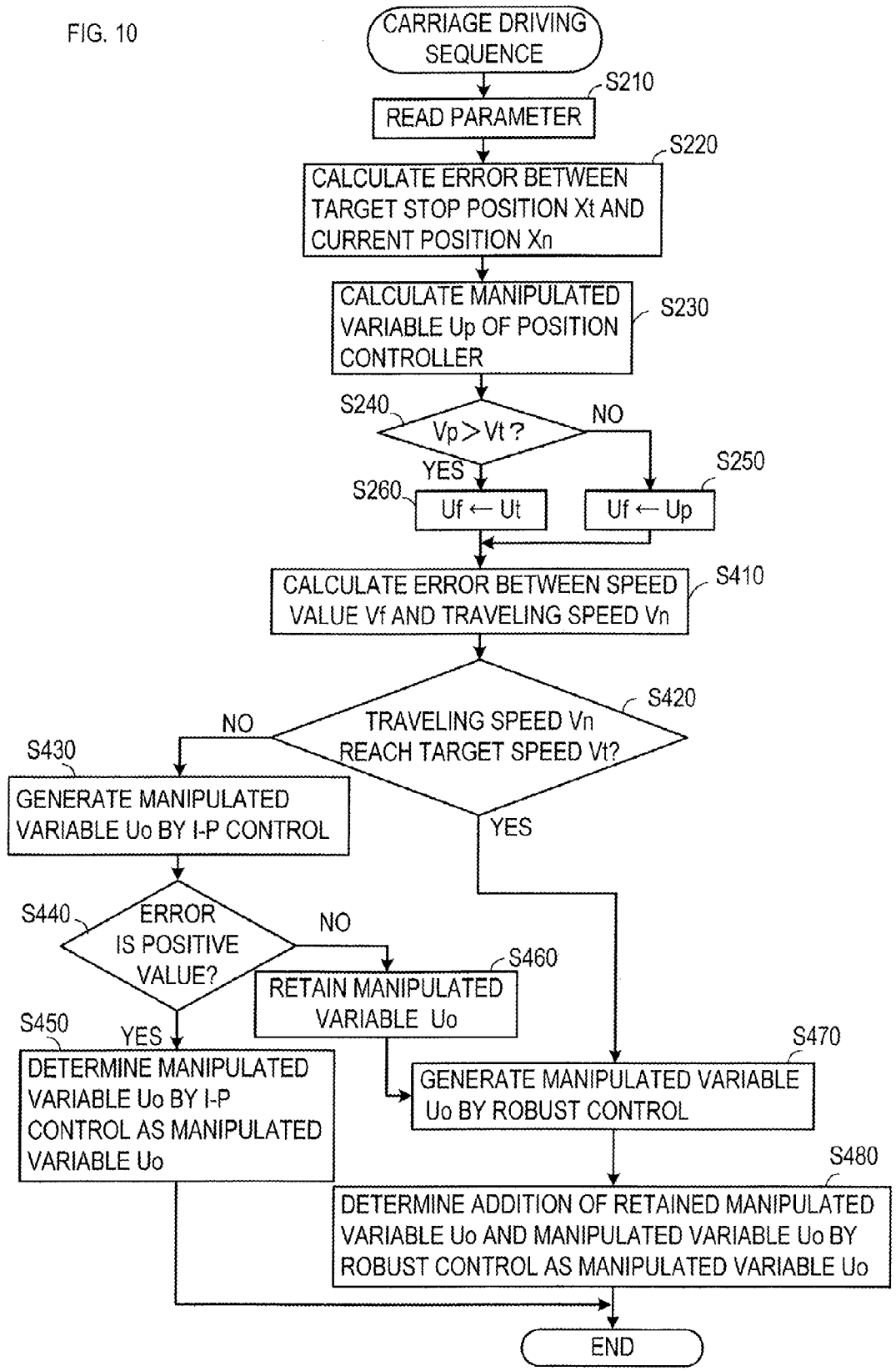
FIG. 10 is a flowchart showing steps in a carriage driving sequence in the second embodiment.

Now, the steps in which the motor controller 7 in the ASIC 3 generates the control signal, when and after the ASIC 3 is started by the CPU 2 by the CR scanning process, is explained referring to FIG. 10.

Similar to the first embodiment, the steps S210 to S260 are executed. Then, the speed controller 78 calculates an error between the speed value Vf corresponding to the manipulated variable Uf corrected by the speed direction corrector 74 and the traveling speed Vn of the carriage 31 calculated by the speed converter 64 (Vf−Vn) (S410). From the calculated error, the manipulated variable Uo is generated which corresponds to the target speed Vt set in the target speed setting register 53 and the traveling speed Vn of the carriage 31 calculated by the speed converter 64. In this step, the error between the speed value Vf corresponding to the manipulated variable Uf and the traveling speed Vn is calculated by the adder 78a. The manipulated variable Uo is generated by the first controller 78c or the second controller 78d.

Particularly, if the traveling speed Vn of the carriage 31 calculated by the speed converter 64 reaches the target speed Vt set in the target speed setting register 53 and it is not negatively determined in a later-explained step of S440 (S420: NO), the switch 78e is flipped to the side of the path to the first controller 78c. The manipulated variable Uo is generated by the I-P control, based on the error between the speed value Vf corresponding to the manipulated variable Uf and the traveling speed Vn using the first controller 78c (S430). Particularly, the manipulated variable Uo that may set "0" to the error is generated by the first controller 78c, based on the gain set in the speed control gain setting register 56.

If the error (Vf−Vn) between the speed value Vf corresponding to the manipulated variable Uf and the traveling speed Vn is a positive value (S440: YES), it is determined that the manipulated variable Uo generated by the first controller 78c should be outputted to the PWM generator 8 as is, so that the pass retainer 78f may pass the manipulated variable Uo to the side of the PWM generator 8 (S450). On the other hand, if the error is not positive value (S440: NO), the pass retainer 78f retains the manipulated variable Uo generated by the first controller 78c (S460). After the manipulated variable Uo is retained, it is positively determined in S420.

In the aforementioned step of S420, if the traveling speed Vn reaches the target speed Vt (S420: YES), or after the manipulated variable is retained by the pass retainer 78f (S460), the switch 78e is flipped to the side of the path to the second controller 78d Furthermore, the manipulated variable Uo by the robust control is generated by the second controller 78d, based on the error between the speed value Vf corresponding to the manipulated variable Uf and the traveling speed Vn (S470). Particularly, the manipulated variable Uo that sets "0" to the error is generated by the second controller 78d, based on a transfer function for the second controller 78d (in the case of the robust control, not the gain but the function is used) set in the speed control gain setting register 56 independently from the gain for the first controller 78c.

The manipulated variable Uo retained by the pass retainer 78f and the manipulated variable Uo generated by the second controller 78d are added by the adder 78g. The resultant is determined to be the manipulated variable Uo outputted to the PWM generator 8 (S480).

[Variations]

In the above, preferred embodiments of the present invention are described. However, the present invention is not limited to the above described embodiments. The present invention can be practiced in various manners without departing from the technical scope of the invention.

In the above embodiments, the ASIC 3 is used to detect the traveling speed and the position of the carriage 31, and to generate the PWM signal. However, for example, a PLD (Programmable Logic Device) may be used instead.

In the first embodiment, the target filter 76 prevents overshooting of the traveling speed of the carriage 31. Instead of the target filter 76, a profile may be provided by which the target speed Vt directed to the motor controller 7 is sequentially varied from a predetermined initial target speed ("0", for example) to the actual target speed Vt. In this case, the reference signal filter 76 is not provided. Also, in the step of S110 in FIG. 7, the CPU 2 sets the data indicating the aforementioned profile in the target speed setting register 53.

In the above embodiments, it is determined that the carriage 31 has entered the deceleration section by determining whether the position of the carriage 31 defined from the count value of the position counter 61 has reached the deceleration start position set in the deceleration start position setting register 52. However, other methods can be also used to determine that the carriage 31 has entered the deceleration section.

Also in the above embodiments, the position controller 72b constituting the position controller 72 of the motor controller 7 generates the manipulated variable by a proportional control. However, the position controller 72b may generate the manipulated variable by the control systems other than the proportional control (such as an I-P control system and a PI control system).

In the second embodiment, the first controller 78c constituting the speed controller 78 of the motor controller 7 generates the manipulated variable by an I-P control system. However, other control systems (such as a PI control system) can be adopted as long as the control systems have high design flexibility for the time response of the plant.

What is claimed is:

1. A motor control device comprising:
a motor that drives a plant,
a speed detection unit that detects a traveling speed of the plant,
a speed control unit that determines a manipulated variable for operating the motor based on an error between a detection speed detected by the speed detection unit and a given target speed,
a position detection unit that detects a position of the plant,
a position control unit that determines a manipulated variable based on an error between a detection position detected by the position detection unit and a target position directed from outside; and
a direction correction unit that corrects directions to the speed control unit based on the manipulated variable determined by the position control unit; and
a speed direction unit that directs the speed control unit to spend a predetermined time to vary the manipulated variable corresponding to the speed of the plant, from the manipulated variable corresponding to an initial speed of the plant lower than the target speed to the manipulated variable corresponding to the target speed,
wherein the direction correction unit directs the target speed to the speed control unit when the manipulated variable determined by the position control unit is a manipulated variable corresponding to or above the target speed and the direction correction unit directs the manipulated variable determined by the position control unit to the speed control unit when the manipulated variable is a manipulated variable corresponding to a speed below the target speed, and
wherein the position control unit determines a manipulated variable directed to the speed control unit by a proportional control based on an error between the detection position and the target position.

2. The motor control device according to claim 1, wherein the speed direction unit comprises a storing unit that stores a manipulated variable profile by which the manipulated variable corresponding to the speed of the plant is sequentially varied from the manipulated variable corresponding to the initial speed of the plant lower than the target speed to the manipulated variable corresponding to the target speed, and directs the speed control unit according to the profile stored in the storing unit.

3. The motor control device according to claim 1, wherein the speed direction unit directs the speed control unit via a delay filter, so that a delay is caused in varying the manipulated variable corresponding to the speed of the plant from the manipulated variable corresponding to the initial speed lower than the target speed to the manipulated variable corresponding to the target speed.

4. The motor control device according to claim 3, wherein the speed direction unit is switched either to cause a delay or not to cause a delay by way of the delay filter, depending on a traveling state of the plant defined by the detection speed or the detection position.

5. A motor control device comprising:
a motor that drives a plant,
a speed detection unit that detects a traveling speed of the plant,
a speed control unit that determines a manipulated variable for operating the motor based on an error between a detection speed detected by the speed detection unit and a given target speed,
a position detection unit that detects a position of the plant,
a position control unit that determines a manipulated variable based on an error between a detection position detected by the position detection unit and a target position directed from outside; and
a direction correction unit that corrects directions to the speed control unit based on the manipulated variable determined by the position control unit,
wherein the direction correction unit directs the target speed to the speed control unit when the manipulated variable determined by the position control unit is a manipulated variable corresponding to or above the target speed and the direction correction unit directs the manipulated variable determined by the position control unit to the speed control unit when the manipulated variable is a manipulated variable corresponding to a speed below the target speed, wherein the position control unit determines a manipulated variable directed to the speed control unit by a proportional control based on an error between the detection position and the target position, and wherein the speed control unit is capable of determining a manipulated variable based on a plurality of control systems including at least a robust control system, and the speed control unit determines the manipulated variable based on the control systems other than the robust control system until the plant reaches the target speed, while the speed control unit determines the manipulated variable based on the robust control system when the plant has reached the target speed.

6. The motor control device according to claim 5, wherein the speed control unit determines the manipulated variable based on the robust control system by adding the manipulated variable obtained when the plant has reached the target speed by the control system other than the robust control system, to the manipulated variable calculated by the robust control system which receives an error between the target speed and the detection speed.

* * * * *